United States Patent [19]

Starodubov

[11] Patent Number: 6,058,226
[45] Date of Patent: May 2, 2000

[54] OPTICAL FIBER SENSORS, TUNABLE FILTERS AND MODULATORS USING LONG-PERIOD GRATINGS

[75] Inventor: Dmitry Starodubov, Los Angeles, Calif.

[73] Assignee: D-Star Technologies LLC, Manhattan Beach, Calif.

[21] Appl. No.: 08/957,153

[22] Filed: Oct. 24, 1997

[51] Int. Cl.[7] .................................. G02B 6/00; G01J 1/04
[52] U.S. Cl. .................................. 385/12; 385/27; 385/28; 385/31; 385/37; 385/123; 385/127; 385/128; 385/141; 385/1; 385/2; 250/227.11; 250/227.14
[58] Field of Search .................................. 385/12, 27, 28, 385/31, 37, 123, 127, 128, 141, 1, 2, 3; 250/227.11, 227.14, 227.18

[56] References Cited

U.S. PATENT DOCUMENTS

| | | | |
|---|---|---|---|
| 4,996,419 | 2/1991 | Morey | 250/227.18 |
| 5,007,705 | 4/1991 | Morey et al. | 385/37 X |
| 5,430,817 | 7/1995 | Vengsarkar et al. | 385/37 |
| 5,550,940 | 8/1996 | Vengsarkar et al. | 385/28 |
| 5,579,143 | 11/1996 | Huber | 359/130 |
| 5,641,956 | 6/1997 | Vengsarkar et al. | 250/227.14 |
| 5,647,039 | 7/1997 | Judkins et al. | 385/37 |
| 5,668,821 | 9/1997 | Hodgson et al. | 372/6 |
| 5,767,411 | 6/1998 | Maron | 73/705 |
| 5,841,920 | 11/1998 | Lemaire et al. | 385/37 |
| 5,864,641 | 1/1999 | Murphy et al. | 385/12 |
| 5,999,671 | 12/1999 | Jin et al. | 385/37 |
| 6,011,866 | 1/2000 | Abramov et al. | 385/37 |
| 6,011,881 | 1/2000 | Moslehi et al. | 385/10 |

OTHER PUBLICATIONS

Vengsarkar et al., "Long–period Fiber Gratings s Band–Rejection Filters," Journal of Lightwave Technology, vol. 14, No. 1, Jan. 1996, pp. 58–65.

Bhatia et al., "Optical fiber long–period grating sensors," Optics Letter, vol. 21, No. 9, May 1, 1996, pp. 692–694.

Nagamura et al., "Novel all optical light modulation based on complex refractive index changes of organic dye–doped polymer film upon photoexcitation," Appl. Phys. Lett., vol. 69 No. 9, Aug. 195, pp. 1191–1193.

Mauchline et al. "Low voltage tunable in–line channel dropping filter using liquid crystal waveguide overlays," Electron. Lett. vol. 33, No. 11, May 22, 1997, pp. 985–986.

Cruz et al., "Fiber Bragg gratings tuned and chirped using magnetic fields," Electron. Lett. vol. 33, No. 3, Jan. 30, 1997, pp. 235–237.

Xu et al., "Turnable fibre bandpass filter based on a linearly chirped Bragg grating for wavelength demultiplexing," Electron. Lett. vol. 32, No. 20, Sep. 26, 1996, pp. 1918–1919.

Morante et al., "New micro–optic cell optic fibre gas sensors with interferometric noise reduction," Electron. Lett. vol. 33, No. 16, Jul. 31, 1997, pp. 1407–1409.

(List continued on next page.)

*Primary Examiner*—Brian Healy
*Attorney, Agent, or Firm*—Fulwider Patton Lee & Utecht, LLP

[57] ABSTRACT

An optical system for selectively filtering and modulating light transmitted through an optical fiber. A tunable optical filter is provided which is capable of selectively correcting, amplifying or modulating light within an optical fiber by selectively extracting light from the core of the fiber into the cladding where it may be acted upon using an active device. Where the active device includes an electrically sensitive material, a constant or varying voltage applied to the material causes the refractive index of the material to change, affecting the transmission of the light within the fiber. Various combinations of gratings and electrically driven elements can be combined to provide various types of filters, amplifiers, modulators and delay lines that are easily incorporated into an optical fiber line. Where the optically active material reacts to selected gases, liquids or radiation, the presence of such a gas, liquid or radiation may also change the refractive index of the material, providing an environmentally robust sensor.

52 Claims, 7 Drawing Sheets

OTHER PUBLICATIONS

Hill et al., "Polymeric in–line fiber modulator using novel processing techniques," OFC '96 Tech. Digest, Conf. Feb.–Mar. 1996, pp. 166–167.

Hamilton et al., "High brandwidth traveling wave polymeric in–line fiber modulator," CLEO'97 Tech. Digest, May 1997, p. 293.

Devaux et al., "InGaAsP/InGaAsP/InAsP MQW polarization–independent modulator with high optical power saturation," OFC'97 Tech. Digest, 139 (1997).

Dianov et al., "In–fiber Mach–Zhender Interferometer Based On A Pair Of Long–Period Gratings," Proc. 22 European Conference on Optical Communication ECOC'96, 1, 65 (1996).

Juma, "Fiber Bragg Gratings: Ready To Drive Markets," Lasers & Optronics, May 1996, pp. 41–44.

Juma, "Bragg gratings boost data transmission rates," Reprinted from Laser Focus World, Nov. 1996.

Kokx, "Bragg Today," vol. 1, Issue 1, Fall 1996, pp. 1–4.

Erdogan et al., "Fiber phase gratings reflect advances in lightwave technology," Laser focus World, Feb. 1994, pp. 73–80.

St J Russell et al., "Fibre gratings," Physics Word, Oct. 1993, pp. 41–46.

Dianov et al., "Photoinduced Long–Period Fiber Grating As A Promising Sensor Element," (Article Undated).

Vasiliev et al., "Postfabrication resonance peak positioning of long–period cladding–mode–coupled gratings," Optics Letters, vol. 21, No. 22, Nov. 15, 1996, pp. 1830–1832.

Kashyap, "Photosensitive Optical Fibers: Devices and Applications," Optical Fiber Technology 1, 17–34 (1994), pp. 17–34.

Bhatia et al., "Optical Fiber Long–Period Grating Sensors," Technical Update (Undated).

Arce–Diego et al., "Fiber Bragg grationg as an optical filter tuned by a magnetic field," Optics Letters, vol. 22, No. 9, May 1, 1997, pp. 603–605.

OPTICAL FIBER SENSORS, TUNABLE FILTERS AND MODULATORS USING LONG-PERIOD GRATINGS

BACKGROUND OF THE INVENTION

The present invention relates to optical media and, more particularly, to refractive index gratings incorporated into optical fibers for modulating, filtering, and altering light transmitted through the fibers.

Optical fibers have long been used to transmit light signals with little loss in intensity over great distances. An important problem, however, has been the ever increasing need for faster data transmission. One approach to increasing the transmission capacity of the currently installed base of optical fiber transmission lines is to use wavelength division multiplexing (WDM). Using this approach, a single optical fiber may carry several channels of data simultaneously, with each channel using a slightly different wavelength of light.

With the advent of Bragg gratings that can be incorporated directly into the optical fiber itself, it became possible to build filters to de-multiplex the various channels of data. However, the present generation of wavelength division multiplexing fiber gratings are primarily passive and are selective over a single, fixed, narrow band of wavelengths. Moreover, Bragg gratings are temperature and strain sensitive. Thus, their selectivity and efficiency may be reduced under certain conditions, and there is presently no way, other than adding an additional filter into the transmission line, to correct artifacts created when the grating is operated outside of its design temperature range, or where, because of routing of the fiber, strain is induced in the grating.

Another problem is that even the best optical fibers exhibit some loss of light, primarily due to absorption of the light within the fiber. To solve this problem, amplifiers are typically placed along a transmission line to amplify the light in the fiber to maintain the amplitude of the light at an optimum level. Currently available amplifiers, however, amplify different wavelengths by different amounts, which makes them less than ideal for amplifying WDM lines having multiple channels at different wavelengths. Ideally the gain of each amplifier should be the same for all channels, if the signals all have the same strength. Alternatively, the gain should be adjustable for each channel to accommodate variations in signal strength caused by changes in the operating environment, such as the ambient temperature, or changes causes by fiber strain, or the distance traveled by the signals in the fiber, since signals traveling a relatively longer distance will have decreased amplitude compared to signals traveling a shorter distance.

While in certain cases the sensitivity of fiber gratings to environmental factors is disadvantageous, that same sensitivity may be used to construct robust sensors, since the fiber itself, being manufactured of doped fused silica, is relatively unaffected by radiation and electromagnetic fields. Temperature and stress sensors using optical fibers incorporating fiber gratings are well known. What has been difficult to achieve, however, are sensors that can detect the presence of chemicals or radiation, because the light passing through the core of the optical fiber is isolated from the chemical by the cladding of the optical fiber, and the core of the fiber is typically unaffected by radiation.

Much of the difficulty in addressing the shortcomings of currently available gratings and amplifiers, or manufacturing sensors that detect environmental variables other than temperature or strain, stems from the very characteristic of the optical fibers that make them so useful as a transmission medium. Once a light beam is coupled into the core of an optical fiber, the light beam cannot easily be modified without extracting the light beam from the fiber. The process of light extraction and modification often requires costly electronic equipment and careful optical alignment, both of which are prone to failure. One approach avoiding the extraction of light from the core of the fiber has been to leave the light in the core and introduce a quadratic susceptibility into the core by poling the fiber in the presence of heat or ultraviolet light to make the fiber into an electrically controlled modulator. This process, however, is complicated, time consuming, and the resulting device operates only at frequencies below one megahertz. Moreover, the electrodes necessary to induce the quadratic susceptibility are difficult to fabricate and the resulting device normally requires modulating voltages in excess of 100 volts. Furthermore, the induced non-linearity using this technique is small and relatively unstable.

More recently, an acoustic fiber modulator utilizing sound energy to induce modulation of light within the core of a fiber has been reported. However, this approach is complex, requires a separate transducer, and still does not modulate at frequencies high enough to be commercially useful.

Various techniques have been developed to extract light from the core of a fiber so that the light may be modulated or amplified. In one approach, part of the cladding surrounding the core of the optical fiber is polished away on one side of the fiber so that a portion of the light in the core can be coupled out of the fiber. It is also well known that bending a fiber will cause some of the light transmitted through the core of the fiber to be coupled into the cladding of the fiber, where it becomes more accessible. However, both of these techniques are disadvantageous, either because of the difficulty and cost to implement, or because the technique damages the fiber.

What has been needed, and heretofore unavailable, has been an inexpensive, yet highly reliable system for interacting with the light passing through an optical fiber to provide for active processing of the optical signals transmitted through the fiber. Additionally, there is a need for highly sensitive, yet durable, reliable and inexpensive environmental sensors for detecting and measuring the presence of otherwise difficult to monitor substances, such as gases, chemicals or radiation in situations that would destroy other types of sensors or render them useless after only a short period of time. The present invention fills this need.

SUMMARY

The invention provides a device for controlling the transmission of light within an optical fiber by providing a means for controllably extracting selected wavelengths of light from the core of the optical fiber into the cladding layer of the optical fiber and for processing the extracted light to alter the characteristics of the light. The present invention accomplishes these tasks without requiring bending or polishing of the optical fiber, and alters the characteristics of the light over a much broader range than previously possible using prior art techniques.

One embodiment of the present invention provides a tunable optical filter incorporating an optical grating formed within the core of the optical fiber and an active element applied to the exterior of the optical fiber over the grating. In this embodiment, the active element may be selectively activated, changing the resonance wavelength of the grating, thus allowing selected wavelengths of the light to be extracted from the core of the optical fiber into the cladding layer of the optical fiber.

Another embodiment of the present invention provides an environmentally robust sensor for sensing the presence of gases, liquids or radiation. In this embodiment, an active element is mounted on the exterior of a section of an optical fiber and overlays a grating formed in the core of the optical fiber. Depending on the material forming the active element, the presence of a selected gas, liquid or radiation will cause a change in a characteristic of the active element resulting in a change in the light transmitted through the optical fiber. In one aspect, the presence of the selected gas, liquid or radiation may cause a change in the refractive index of the active element, which may be a porous polymer into which the selected gas, liquid or radiation diffuses, which then interacts with the refractive indices of the core and cladding of the optical fiber to either allow transmission of a selected wavelength of light through the optical fiber, or to block a selected wavelength of light through the optical fiber.

In still another embodiment of the present invention, an optically active element may be mounted on the exterior of the optical fiber. When the active element is activated by, for example, applying a voltage across a pair of electrodes to energize an electrically sensitive material located between the electrodes, light being transmitted through the optical fiber may be modulated. Such modulation is useful to control amplitude of optical signals within light being transmitted.

Yet another embodiment provides a wavelength tunable reflection filter by combining a tunable filter as described above with a broadband grating formed in the core of the optical fiber at a location downstream of the tunable filter. When the resonance wavelength of the tunable filter does not match the resonance wavelength of the broadband grating, light having a selected wavelength will be reflected by the broadband grating, acting as a narrow band modulator for light having the selected wavelength. When the tunable filter is activated such that the resonance wavelength of the tunable filter matches the resonance wavelength of the broadband grating, no light is reflected by the broadband grating and all of the light is transmitted through the core of fiber past the grating.

Still another aspect of the present invention provides a tunable band pass reflection filter. This embodiment combines two tunable filters with a broadband reflection grating. In this embodiment, light having a selected wavelength is extracted out of the core of an optical fiber into the cladding layer by a first tunable filter. The selected wavelength of light is transmitted through the cladding layer around a blocking element formed in the core of the fiber. A second tunable filter located downstream of the blocking element returns the light from the cladding into the core of the fiber. With a properly selected broadband filter located further downstream of the second tunable filter, the light of the selected wavelength may be reflected or transmitted, depending on how the tunable filter portion of the device is tuned.

Other features and advantages of the invention will become apparent from the following detailed description taken in conjunction with the accompanying drawings, which illustrate, by way of example, the features of the invention.

DETAILED DESCRIPTION OF THE PREFERRED EMBODIMENTS

Figure 1:
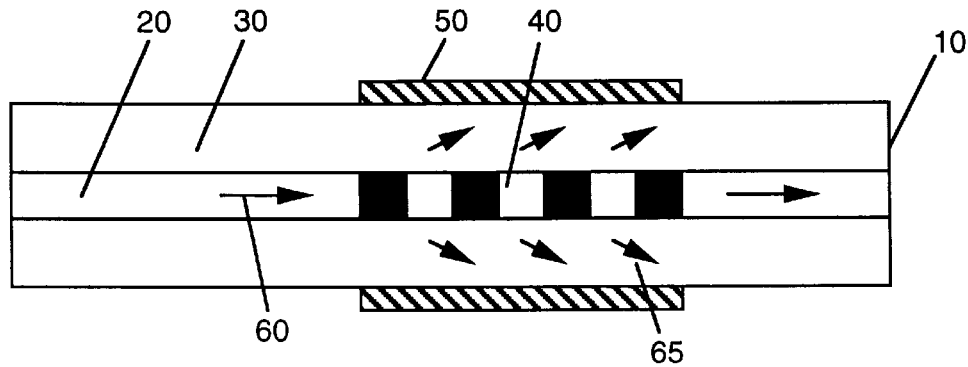
FIG. 1 is a schematic cross-sectional view of a fiber optic element showing a grating in the fiber core and external coating layer of the present invention.
Figure 2A:
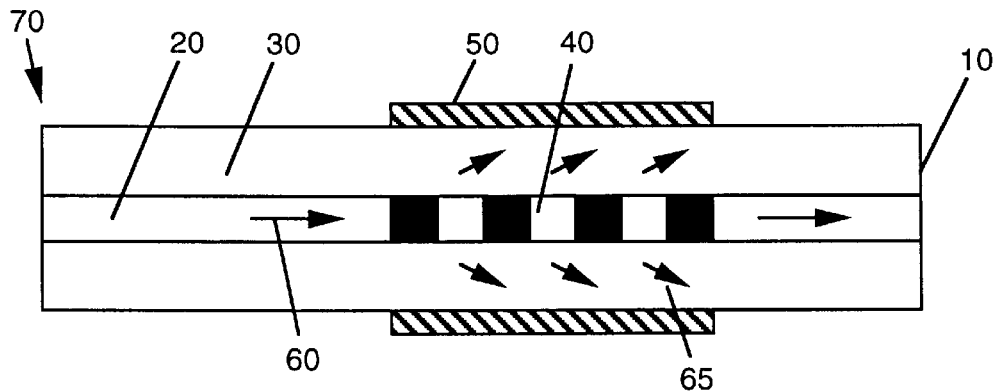
FIGS. 2a and 2b are schematic cross-sectional view of a system including a fiber optic sensor incorporating the invention of FIG. 1.
Figure 2B:
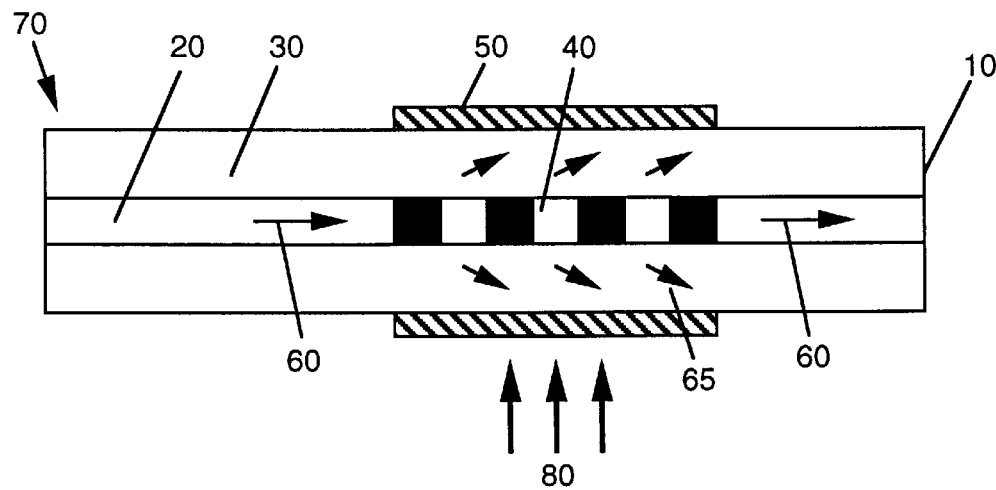

As shown in the drawings for purposes of illustration, the invention is embodied in a fiber optic device providing a system and method for affecting the characteristic of a beam of light transmitted through an optical fiber. In its broadest sense, the invention contemplates a combination of at least one grating formed within the core of an optical fiber and a coating or layer formed, mounted on, or provided around an outer surface of a cladding layer of the optical fiber. Depending on the functionality desired, the coating or layer may be positioned over the grating formed in the core of the optical fiber, or the coating or layer may be formed at a location along the fiber that is different from the location of the grating. Moreover, one or more gratings may be combined with one or more coatings or layers, which may be positioned over all, some, or none of the gratings, depending on the functionality desired. More particularly, the invention contemplates various embodiments such as sensors, filters and modulators, among other devices, all of which may be constructed using the combination of at least one grating and coating or layer of the present invention. Where different embodiments have like elements, like reference numbers have been used.

As depicted by way of example in FIG. 1, the invention generally comprises an optical fiber 10 having a core 20 and cladding 30. A grating 40 is formed in the core 20 and/or the cladding 30 to couple light into the cladding using methods well known to those skilled in the art. The grating 40 is preferably a long-period grating, or rather, one in which the period is 20 microns or greater. The grating may be, for example, a refractive index grating, wherein light is refracted by either physical modulation, stress modulation, or other applicable techniques. Positioned adjacent the grating 40, surrounding the outer circumference of the optical fiber 10, is a coating 50. The coating 50 may be porous or non-porous, and may be formed from a polymer or any other material whose ability to transmit or reflect light is dependent upon a characteristic of the material that may be altered, or alternatively, the coating 50 may be formed from a material that is sensitive to an electrical or/and magnetic field such that application of a voltage or forming an electrical field in the material using suitable electrodes causes, for example, the index of refraction of the coating to change. The preferred thickness of the coating is 0.5 micron to 200 microns, and may be a function of the desired operation of the optical device.

The index of refraction of the core 20 and the cladding 30 differ slightly so that when light is transmitted down the optical fiber 10 from a light source (not shown), almost all of the light remains in the core. In prior art optical fibers incorporating gratings, the light encountering such a grating is coupled by the grating into the cladding of the optical fiber. However, in the present invention, the addition of the coating 50 to the outside of the optical fiber 10 results in a change in the light-guiding properties of the fiber, since the transmission of the light in the fiber is a function of the relationship between the refractive indices of the core, cladding and coating layer.

The presence of the grating 40 may establish a resonance for a particular wavelength of light in the core such that the particular wavelength of light is coupled from the core into the cladding. Where the index of refraction of the coating layer 50 is less than the refractive index of the cladding, the resonance wavelength is affected by the refractive index of the coating layer 50, so that changing the refractive index of the coating 50 alters the resonant wavelength of light that is coupled into the cladding. Where the refractive index of the coating layer 50 is equal to or greater than the refractive index of the cladding, the light may be coupled into the coating itself where it can be acted upon or analyzed.

One example of a device embodying the present invention is a sensor comprising an optical fiber as described above surrounded by a polymer layer or coating that is sensitive to gamma radiation. In this device, an optical fiber incorporating a grating and polymer layer is positioned between a source of light having a wavelength of 1550 nanometers (nm), for example, a laser diode (not shown), and a light receiver such as a photo-diode (not shown). The refractive index of the polymer layer and the period of the grating are selected so that a resonance within the fiber is established for the particular wavelength of 1550 nm, blocking the transmission of the light from the laser diode to the photodiode. When the sensor is placed in an environment where it is bombarded by gamma radiation 80, the gamma radiation interacts with the polymer layer, changing the refractive index of the polymer layer and shifting the wavelength of the resonance so that light from the laser diode at a wavelength of 1550 nm is now transmitted through the optical fiber to the photodiode, providing an indication that radiation is present. The intensity of the radiation at the position of the sensor may also be determined since the rate of the shift in refractive index of the polymer layer is dependent on the intensity of the radiation.

Similarly, the coating layer may be formed from a porous material so that gases or liquids from whatever ambient environment in which the sensor is placed may be incorporated into the layer through the well known process of diffusion. Depending on the types and levels of gas or liquid present, the refractive index or/and physical dimensions of the layer may change, affecting the resonance within the optical fiber and allowing the detection of gas or liquid. Alternatively, the coating layer may be sufficiently thin so that gases or liquids present in the ambient environment may partially dissolve the coating layer, affecting the resonance within the optical fiber and allowing the detection of the gas or liquid. The sensitive layer 50 may also be formed in the cladding 30 of the fiber 10.

In another embodiment of the present invention, the coating 50 may be doped with optically sensitive molecules, for example, dyes. When light falls upon the layer the optically sensitive molecules will be excited and change the refractive index of the layer, thus affecting the transmission of light through the fiber. The dyes selected to dope the coating may be selected so that only particular wavelengths of light will cause the refractive index of the coating to change, thus forming a highly selective and sensitive optical filter, switch, or sensor.

Figure 3:
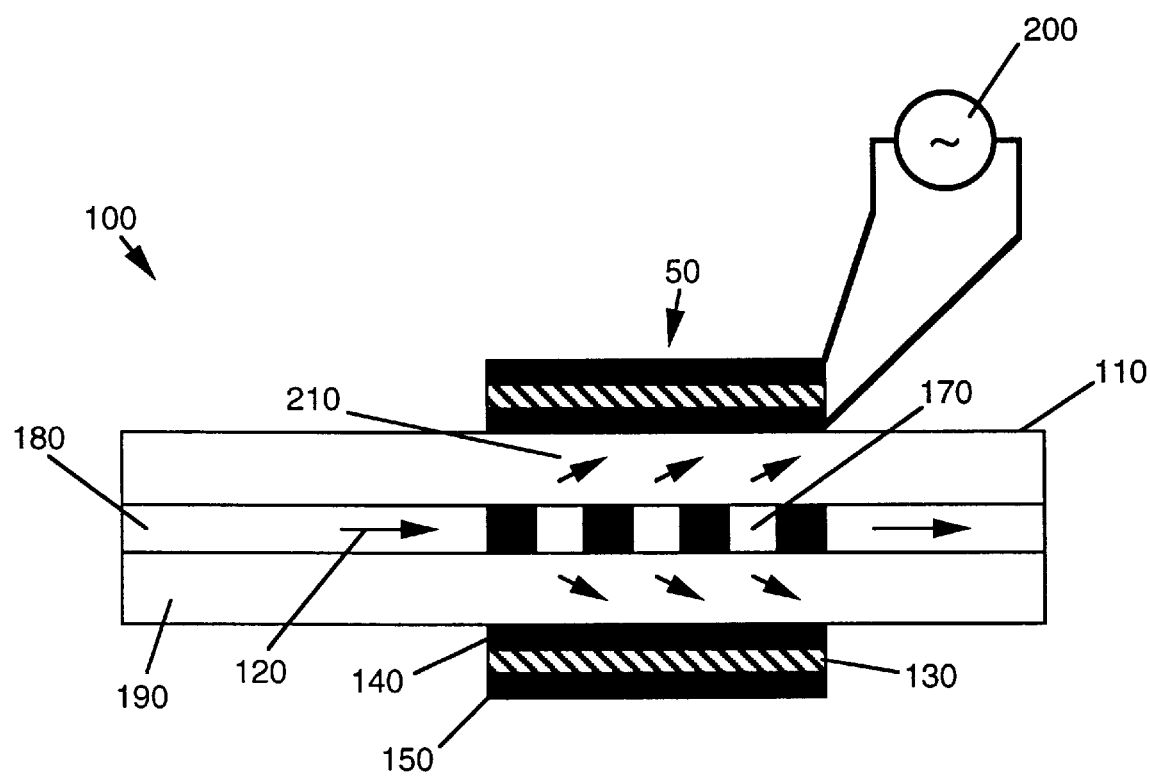
FIG. 3 is a cross-sectional view of a tunable filter having a core grating surrounded by a driveable element having an electrically sensitive layer located between two electrodes electrically connected to a source of electric modulation.

The above described invention is particularly advantageous when embodied, as depicted in FIG. 3, as a tunable filter 100 incorporated into an optical fiber 110 in which a beam of light having multiple channels of information, typically separated by only small differences in wavelength, is transmitted. Using the tunable filter 100 of the present invention, the various wavelengths of light 120 being transmitted through the optical fiber may be filtered to separate the channels of information according to the wavelength of the channel. For example, as shown in FIG. 3, an electro-sensitive layer 130 such as poled poly(Disperse Red 1 methacrylate-co-methyl methacrylate) is formed or mounted between a pair of electrodes 140, 150, thus forming a driveable element 160. While single electrodes are shown in FIG. 3 for simplicity, it will be apparent to one skilled in the art that multi-element electrodes may also be employed. In this exemplary embodiment the preferred thickness (d) of the layer 130 is approximately 0.1 to 10 microns. The element 160 is formed on or mounted to the outer surface of the optical fiber 110 so that the element 160 overlays a fiber grating 170 formed in the core 180 of the optical fiber 110. The inner electrode 140, that is, the electrode located between the electro-sensitive layer 130 and the cladding 190, must be sufficiently thin and/or optically transparent so that the light coupled into the cladding 190 by the grating 170 can effectively interact with the layer 130. When a voltage V is applied across the two electrodes 140, 150 using a suitable electronic driver 200, the voltage V causes an electro-optic effect within the layer 130, altering the refractive index n of the layer 130. The linear electro-optic effect induces a change in the refractive index n of the layer 130 that can be calculated according to the equation:

$$\Delta n = -\tfrac{1}{2} n^3 r E$$

where r is the linear electro-optic coefficient, and E is the applied electric field E=V/d. The light 210 within the cladding is coupled with the changes in the refractive index of the coating 130, with the result that the wavelength of light blocked by the device is now controlled by the applied voltage V. It will also be apparent that a non-uniform index change such as birefringence may be induced in the coating if desired.

In a preferred embodiment, the maximum sensitivity of the tuneable filter 100 is achieved when the index of refraction of the cladding 190 and the layer 130 differ by less than 0.03 and the change ($\Delta n$) in the refractive index of the layer 130 caused by the voltage V is in the range of $10^{-4}$ to $10^{-3}$. For example, with an electro-optic coefficient $r = 15 \times 10^{-12}$ m/V and for an applied voltage V=15 volts and a layer 130 thickness d=3 microns, the resulting index change $\Delta n$ of the layer 130 is approximately $10^{-4}$, which produces a change in the blocking wavelength of the filter 100 on the order of greater than 1 nanometer (nm). Depending on the functionality desired in the optical device, the material comprising the layer 130 may be selected to provide either a rapid or a slow response to the application of the voltage V. Where a slow response is desired, the layer 130 may include liquid crystals. The voltage V applied to the electrodes 140, 150 of the driveable element 160 may be constant, or the voltage V may be changed over time by the driver 200. In this manner, the tuneable filter 100 of the present invention may be dynamic and fast acting when the driveable element 160 includes a fast responding layer 130, such that the wavelength transmitted through the optical fiber 110 may be altered quickly. Similarly, the tunable filter 100 may be also be used as a switch to route the light signal along a path selected from a number of paths. For example, a particular wavelength of the light 120 may be coupled into the cladding 190, as shown by the arrows identified by reference numeral 210. The light 210 in the cladding may either be altered, as described previously, or the light may simply be allowed to remain within the cladding 190.

Figure 4:
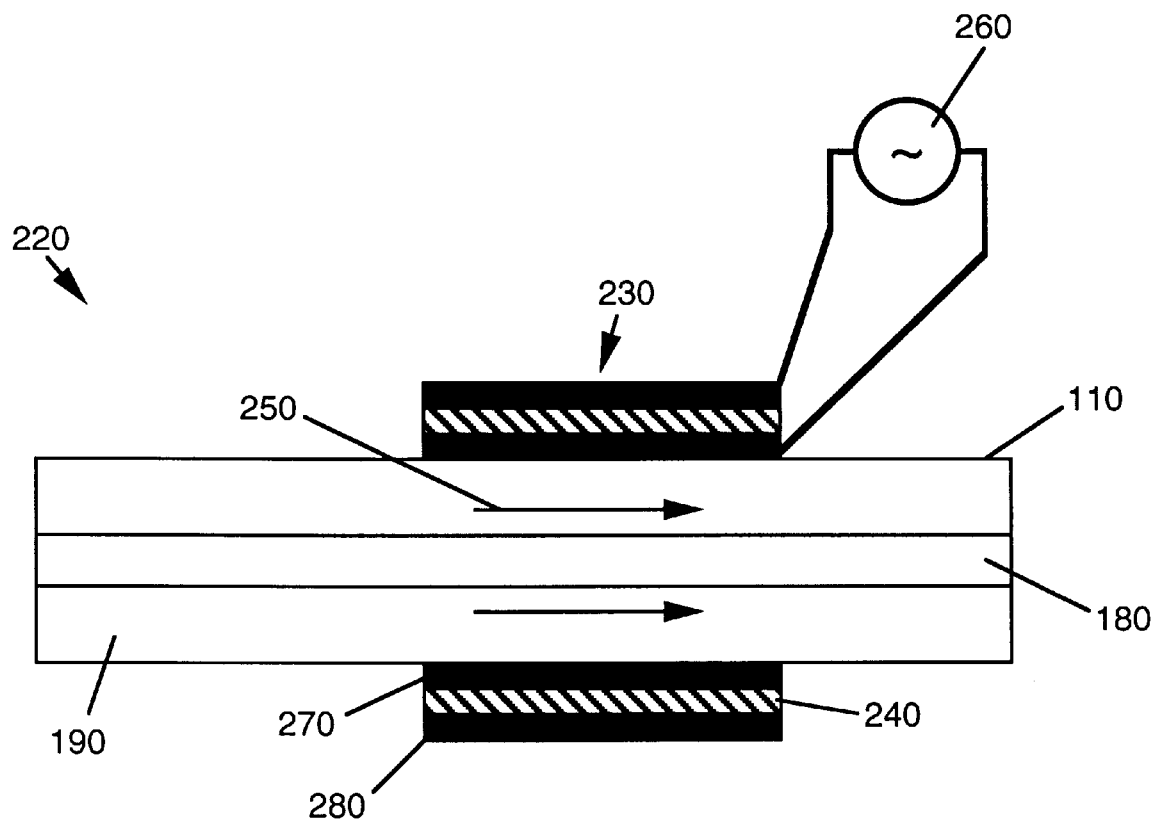
FIG. 4 is a schematic cross-sectional view of a fiber optic element for cladding mode modulation showing a driveable element having an electrically sensitive layer mounted on the fiber.

In addition to the invention described above wherein the layer physically overlays the grating, the present invention also includes embodiments, as depicted by a cladding mode modulator 220 shown in FIG. 4, where a driveable element 230, incorporating an electro-optically active layer 240 is positioned or mounted on the optical fiber 110 so that the driveable element 230 is not positioned over a grating. The positioning of the driveable element 230 in relation to a grating formed at some point within the fiber 110 is dependent on the desired operation of the modulator 220. Although not shown in the modulator 220 depicted in FIG. 4, the element 230 may be placed adjacent to a grating. In this embodiment, light 250 has been coupled into the cladding 190 of the fiber 110. The light 250 in the cladding 190 is now transmitted through the portion of the cladding 190 that underlies the element 230 and may be affected as described above by application of a voltage V by driver 260 across electrodes 270, 280 of the driveable element 230, causing a change in the index of refraction of the layer 240, and thereby affecting the transmission of the light 250 through the cladding 190. For example, depending on the relative values of the refractive indices of the layer 240 and the cladding 190, the light 250 may be further coupled into the layer 240 itself, or it may remain within the cladding 190. Alternatively, the application of the voltage V may be varied over time, affecting the transmission of the light 250 in a periodic manner. One use of such a cladding mode modulator 220 is in conjunction with a fiber laser (not shown) where beams of light coupled into the cladding 190 may be used to pump, or excite, molecules in the core 180 of the fiber 110 to produce laser light. Using the modulator 220 described, the pumping beams may be modulated to effect a modulation of the laser beam produced in the core 180 of the fiber 110. In another embodiment, the modulator 220 may be used to control the pumping, and thus, the output of the fiber laser.

Figure 5:
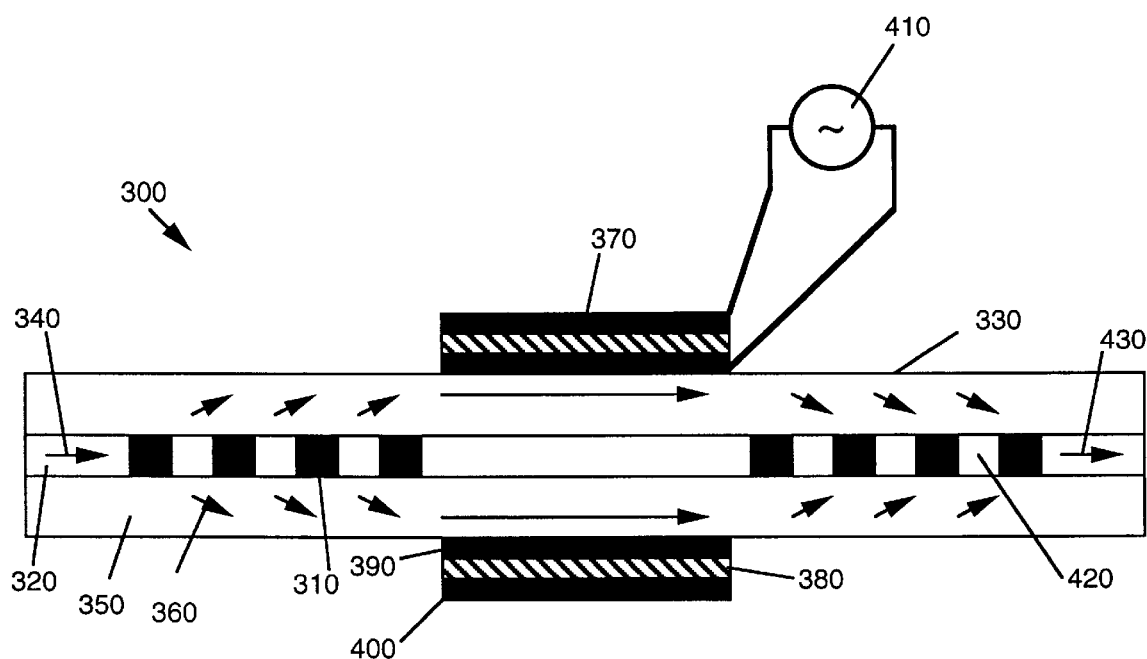
FIG. 5 is a schematic cross-sectional view of a fiber optic element for wavelength—selective light modulation showing a first grating, a driveable element having an electrically sensitive layer as in FIG. 4 attached to the fiber, and a second grating.

Similarly, the various embodiments of the present invention may be combined to provide a variety of optically active devices for controlling and/or modifying light passing through an optical fiber. Another example of such a device incorporating aspects of the present invention is depicted by the wavelength-selective amplitude modulator 300 shown in FIG. 5. In this device, a fiber grating 310 formed in the core 320 of a fiber 330 is used to couple light 340 of suitable resonance wavelength from the core 320 of the fiber 330 into the cladding 350 of the fiber 330. The coupled light 360 then passes through a section of the cladding 350 surrounded by a driveable element 370 comprising an electro-optically active layer 380 formed or mounted between electrode layers 390, 400. When a suitable voltage V is applied to the electrode layers 390, 400 by a driver 410, the refractive index of the electro-optically active layer 380 changes in accordance with the applied voltage V. This refractive index change interacts as described previously with the guiding properties, for example, the refractive index, of the cladding 350 of the optical fiber 330, affecting the light 360 transmitted through the cladding 350. As shown in FIG. 5, a second grating 420 may be located in the core 320 of the fiber 330 downstream of the driveable element 370 to couple any light 360 remaining in the cladding 350 back into the core 320 of the fiber 330. Since only light of a specific wavelength is coupled into the cladding 350 by the grating 310, only that particular wavelength of the light 340 transmitted in the fiber 330 is modulated before it is coupled back into the core 320 by the second grating 420. In this manner, the device may be used as a wavelength, or channel, specific modulator for providing light 430 including optically encoded data to be transmitted further downstream in the fiber 330. The preferred distance between the grating 310 and the second grating 420 is dependent on the wavelength of light that is desired to be modulated, but is typically less than 50 centimeters since transmission of light within the cladding 350 of the fiber 330 for extended distances results in a decrease in the amplitude of the transmitted light 360. It is also possible to couple only a portion of the light 340 from the core 320 of the fiber 330 into the cladding. When operated in this manner, the device operates as an interferometer.

Figure 6:
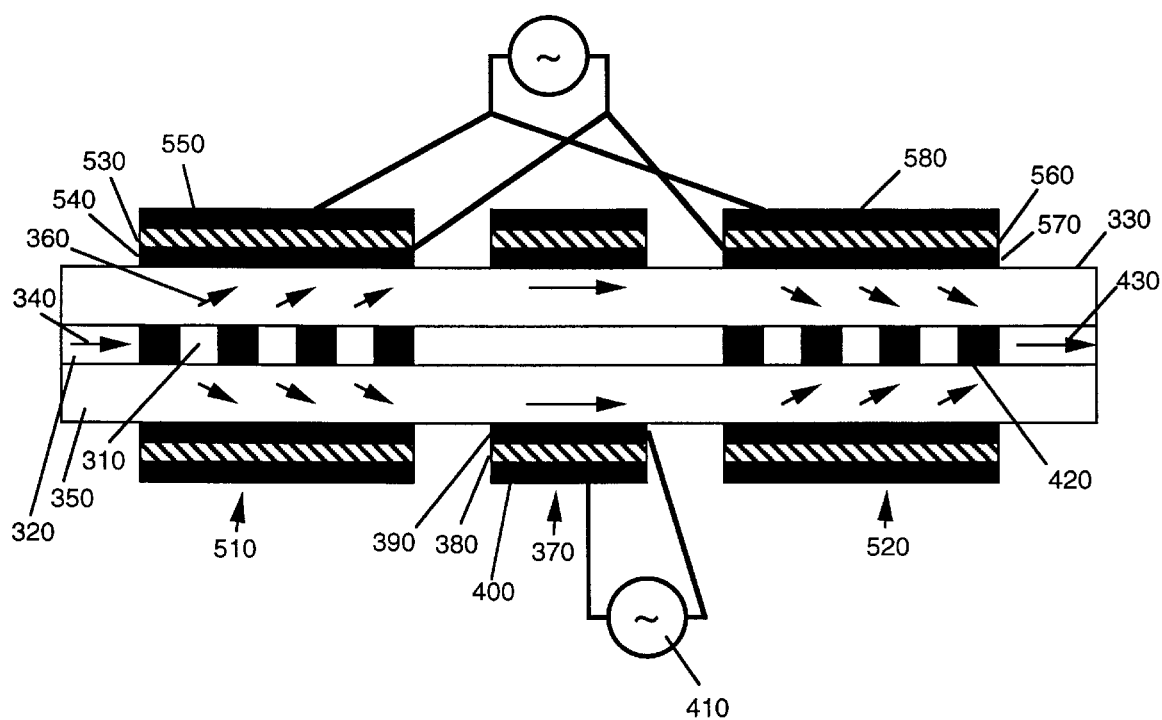
FIG. 6 is a schematic cross-sectional view of a fiber optic filter that can independently select and modulate individual wavelengths, showing two tunable filters as in FIG. 3 with the cladding mode modulator of FIG. 4 located between them.

FIG. 6 depicts a further example of the invention embodied in a fiber grating filter 500 having independently tunable attenuation and resonant wavelengths. This embodiment also depicts how various aspects of the present invention can be combined to provide a variety of optically active devices for modulating, blocking or otherwise altering the light transmitted through an optical fiber. The fiber grating filter 500 depicted in FIG. 5 includes the wavelength-selective amplitude modulator 400 of the FIG. 5. Accordingly, like elements in both Figures are identified using like reference numerals. The filter 500 is assembled by adding two additional driveable elements 510, 520. Driveable element 510 is positioned around grating 310 and includes a driveable optically active layer 530 formed or mounted between electrode layers 540, 550. Similarly, driveable element 520 is positioned around the second grating 420 and has a driveable optically active layer 560 formed or mounted between electrode layers 570, 580. Both driveable element 510 and driveable element 520 may be driven by signals provided by driver 590. The identical signals may be provided to both driveable elements 510 and 520 by driver 590, or signals may be provided to element 510 that are different from the signals provided to element 520 by driver 590. By manipulating the signals applied to the electrodes 540, 550 and 570, 580 the wavelength of light coupled into the cladding for processing by the cladding mode modulator depicted in FIG. 5 may be selectable, rather than fixed. Modulation of the signal may be provided by modulator 410 independently, as is depicted in FIG. 5. This allows for independently adapting to and correcting changes in the wavelength and/or signal strength of the transmitted light within the fiber 330. It is also possible to operate the device such that a portion of the light 340 remains in the core after the having passed the grating 310. In this manner it is possible operate the device as a tunable Mach-Zehnder interferometer.

Figure 7:
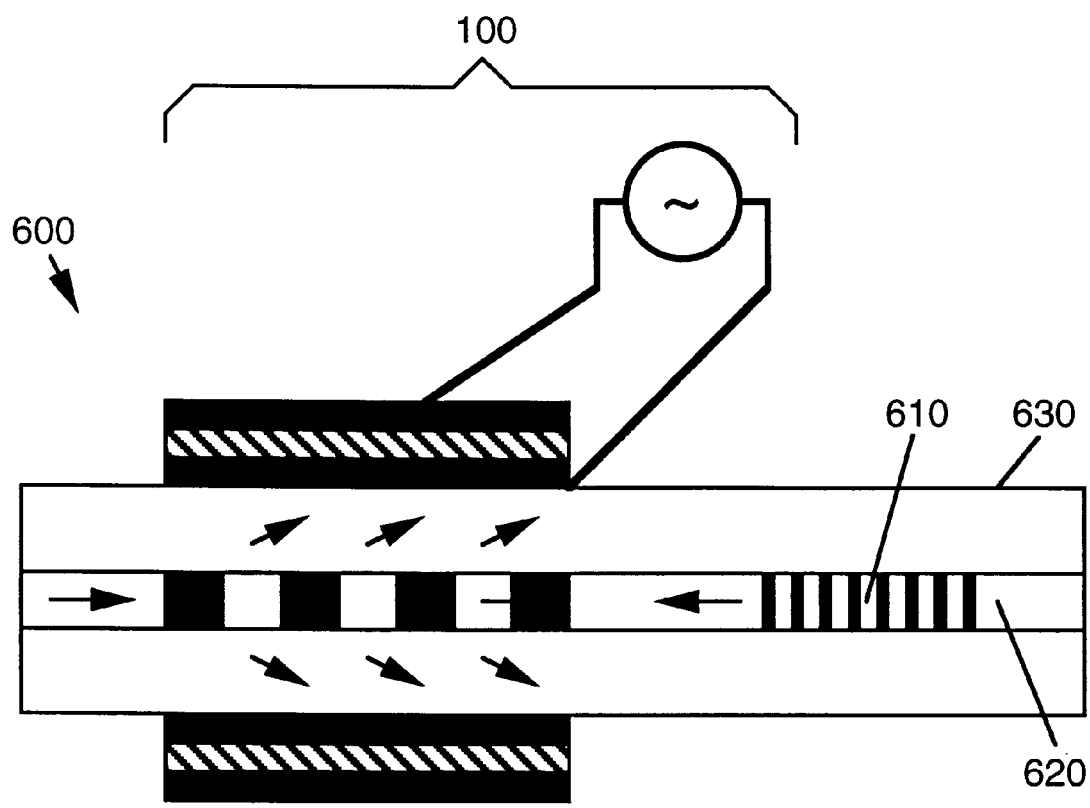
FIG. 7 is a schematic cross-sectional view of an electrically controlled modulator for a single wavelength including the tunable filter of FIG. 3 followed by a narrow-band reflection grating.

A further example of the various manners in which aspects of the present invention may be combined to form novel optical devices is illustrated by the wavelength tunable reflection delay line filter 600 depicted in FIG. 7. In this embodiment, a fixed reflection grating 610 is formed in the core 620 of an optical fiber 630 downstream of the tunable grating 100 of the present invention as described above with reference to FIG. 3. The resonance wavelength of the tunable grating 100 can be altered to match or not match the resonance wavelength of the fixed reflection grating 610. When the resonance wavelength of the gratings 100, 610 match no light is reflected at the resonance wavelengths and the light is transmitted through the core 620. When the resonance wavelengths of gratings 100, 610 do not match, light is reflected at the resonance wavelength of the fixed grating 610. This filter 600 acts as a narrow-band modulator for light that is matched to the resonance of the reflection grating 610, and can be used to introduce a selected "delay" in the reflected light. This "delay" is particularly useful where it is necessary for light from two fibers of different length must arrive at a particular location having a predetermined time relationship. Alternatively, the filter 600 may assist in matching signals carried by different wavelengths of light within the same optical fiber.

Figure 8:
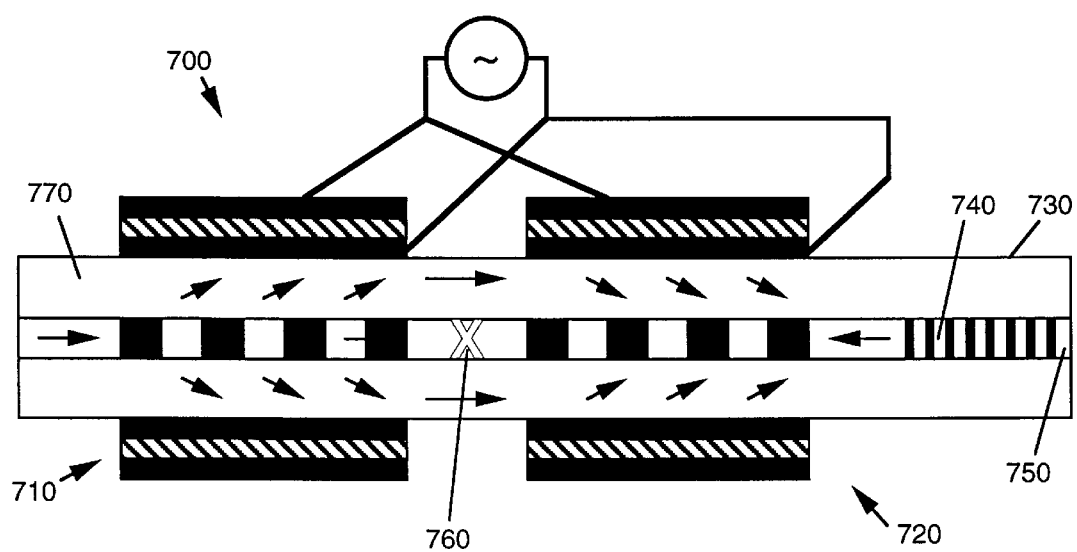
FIG. 8 is a schematic cross-sectional view of a tunable reflection filter showing a fiber optic device having two of the tunable filters of FIG. 3 with a lossy portion of the fiber core located between them and a broad-band reflection grating located downstream of the second tunable filter.

A further example of the broad application of the present invention is illustrated by the broadly tunable band pass reflection filter depicted in FIG. 8. In this embodiment of the present invention, two tunable gratings 710, 720 as described above with reference to FIG. 3 are positioned along an optical fiber 730. A broadband Bragg grating 740 is formed in the core 750 of the fiber 730 downstream of the tunable grating 720. The broadband Bragg grating 740 may be constructed by, for example, decreasing the length of the grating 740 to approximately 1 millimeter (mm) or by making it chirped. A suitable broad-band blocking element 760 is formed in the core 750 of the fiber 730 between the tunable gratings 710, 720 so that light cannot be transmitted between them through the core 750 of the fiber 730. This blocking element 760 may be formed, for example, by intentionally damaging the core 750 of the fiber 730. Alternatively, the core 750 may be altered in such a manner as to have a high loss, that is, adversely affect the amplitude of light transmitted through the core 750, at that location, or a grating may be formed in the core 750 that reflects or removes all of the transmitted light out of the core 750 of the optical fiber 730. This latter effect can be achieved by forming another long-period grating (not shown) having a different period than the tunable gratings 710, 720. In such an embodiment, light at the resonance wavelength of tunable grating 710 is deflected into the cladding 770 where it is transmitted through the cladding 770 past the blocking element 760 and then is returned to the core 750 by the second tunable grating 720, which is tuned to the same resonant wavelength as tunable grating 710. The light then continues through the core 750 where it encounters the broadband Bragg grating 740, which reflects the light back along its original path, through grating 720 and into the cladding 770 until the light is again returned into to the core 750 by tunable grating 710, whereby the light is then propagated upstream through the optical fiber 730 towards its source. By varying the resonance wavelength of the tunable gratings 710, 720 in tandem, the wavelength of light that is reflected by the device can be altered.

In another embodiment, the Bragg reflection grating 740 may be chirped. In a chirped grating, the grating is formed so that it has several regions, with each region having different resonant wavelengths. Because it has different resonant wavelengths located at different locations along the optical fiber 730, the chirped grating imparts different optical delays to different wavelengths. Using the techniques of the present invention, the gratings 710, 720 may be tuned to provide a variable delay line which is useful for phased array antennas.

From the foregoing, it will be appreciated that the system of the invention provides a way of altering the characteristics of light transmitted through an optical fiber to enhance the transmission of data through the fiber. Further, the system accomplishes this without costly modification or polishing of the optical fiber. Moreover, the system provides a controllable method of selectively coupling wavelengths of light from the core of the fiber into the cladding of the fiber without bending the fiber, which prevents damage to the fiber due to the strain of bending. The system of the present invention may be easily and inexpensively added to existing fiber optic cables using known techniques, and thus provides for improved reliability and control of the light, and thus the data, transmitted through the optical fiber.

While several forms of the invention have been illustrated described, it will be apparent that various modifications can be made without departing from the spirit and scope of the invention. Accordingly, the invention is not intended to be limited except by the appended claims.

I claim:

1. An optical filter comprising:
   an optical waveguide having a core portion surrounded by a cladding layer;
   a long-period grating formed in the core of the optical waveguide; and
   an active element applied to a surface of the optical waveguide and overlaying at least a portion of the grating, the active element having a first characteristic responsive to a signal applied to the active element to cause light to be extracted from the core portion into the cladding layer of the optical waveguide and transmitted within the cladding layer in a guided mode alone the waveguide.

2. The filter of claim 1, wherein the applied signal comprises a light signal and the active element is responsive to the light signal.

3. The filter of claim 1, wherein the active element is responsive to an electric signal.

4. The filter of claim 1, wherein the active element is responsive to an electromagnetic field.

5. The filter of claim 1, wherein the optical waveguide comprises an optical fiber.

6. The filter of claim 3, wherein the active element comprises a first electrode layer positioned adjacent to the surface of the optical waveguide and an electrically active layer formed between the first electrode and a second electrode layer.

7. The filter of claim 6, further comprising a source of electricity, wherein applying electricity from the source of electricity to the first and second electrode layers of the active element causes a change in the characteristic of the electrically active layer.

8. An optical sensor comprising;
   a light source;
   an optical waveguide having a core surrounded by a cladding layer, the optical waveguide optically coupled to the light source and configured to transmit light through the core from the light source to a selected location;

an optical grating formed in the optical waveguide, the grating being configured to create a resonance to affect the light transmitted from the light source; and a layer of environmentally sensitive material applied to a surface of the optical waveguide and overlaying at least a portion of the optical grating, wherein a change in the environment causes a change in the layer of environmentally sensitive material affecting the resonance created by the grating, the change of resonance in the grating causing light to be extracted from the core into the cladding layer and transmitted through the cladding layer in a direction away from the light source.

9. The sensor of claim 8, wherein the optical waveguide is an optical fiber.

10. The sensor of claim 9, wherein the environmentally sensitive material is a polymer.

11. The sensor of claim 10, wherein the polymer is a doped polymer.

12. The sensor of claim 9, wherein the environmentally sensitive material is porous.

13. An optical modulator for modulating light transmitted in a guided mode within a cladding layer of an optical waveguide having a core covered by the cladding layer, comprising:

an active element mounted on a side of the cladding layer of the optical waveguide for modulating the light transmitted in the guided mode within the cladding layer of the waveguide.

14. The modulator of claim 13 wherein the active element is electrically sensitive.

15. The modulator of claim 14, further comprising:

a source of electrical energy operably connected to the active element, wherein a characteristic of the active element is responsive to the energy to cause a change in a characteristic of the light in the cladding.

16. The modulator of claim 13, further comprising a grating formed in the core of the optical waveguide at a location upstream of the active element.

17. The modulator of claim 16, wherein the grating is a long period grating.

18. The modulator of claim 16, further comprising a second grating formed in the core of the optical waveguide at a location downstream of the active element.

19. The modulator of claim 15, wherein the characteristic of the active element is the refractive index.

20. The modulator of claim 14, wherein the active element comprises a first electrode, a second electrode, and an electrically sensitive material, the electrically sensitive material being responsive to an electrical signal applied to the first and second electrodes.

21. The modulator of claim 16, wherein the first grating and the second grating form a Mach-Zehnder interferometer.

22. An optical device for affecting the light in an optical waveguide having a core and a cladding layer, comprising:

a first grating formed in the optical waveguide, the first grating being operable to selectively extract light transmitted through the core of the waveguide into the cladding layer, the extracted light thereby being transmitted through the cladding layer;

an active element applied to a side of the optical fiber in at least partially overlapping alignment with the first grating; and a second grating formed in the optical waveguide at a location in the optical waveguide downstream of the first grating.

23. The optical device of claim 22, wherein the active element is activated to change a characteristic of the first grating, wherein light transmitted through the core of the waveguide is extracted from the core and transmitted through the cladding layer.

24. The optical device of claim 23, wherein the characteristic of the first grating is the resonance wavelength of the grating.

25. The optical device of claim 24, wherein the active element is activated to change the resonance wavelength of the first grating to match a resonance wavelength of the second grating.

26. The optical device of claim 24, wherein the active element is activated to change the resonance wavelength of the first grating to a resonance wavelength that is different from a resonance wavelength of the second grating, wherein light being transmitted towards the second grating is reflected by the second grating such that the reflected light is transmitted back towards the first grating.

27. The optical device of claim 22, further comprising:

a third grating formed in the core of the optical waveguide at a location between the first grating and the second grating; and a second active element mounted on a side of the optical waveguide in at least partially overlapping alignment with the third grating.

28. The optical device of claim 27, further comprising a blocking element formed in the core of the optical waveguide at a location in the core between the first grating and the third grating.

29. The optical device of claim 22, wherein the active element comprises a first electrode and a second electrode and an electrically sensitive material responsive to a signal applied to the first electrode and the second electrode.

30. The optical device of claim 29, further comprising an activation source in electrical connection with the first electrode and the second electrode for activating the active element to change a characteristic of the active element.

31. The optical device of claim 27, wherein the second active element comprises a third electrode and a fourth electrode and an electrically sensitive material responsive to a signal applied to the third electrode and the fourth electrode.

32. The optical device of claim 31, further comprising an activation source in electrical connection with the first electrode, the second electrode, the third electrode and the fourth electrode for activating the active element to change a first characteristic of the active element and for activating the second active element to change a second characteristic of the second active element.

33. The optical device of claim 32, wherein the activation source is controlled to change the first characteristic of the first active element to extract a selected wavelength of light from the core of the optical waveguide into the cladding layer of the optical waveguide and the activation source is controlled to change the second characteristic of the second active element to return the selected wavelength of light from the cladding layer into the core of optical waveguide.

34. The optical device of claim 27 wherein the active element is activated to provide an interferometer.

35. The optical device of claim 22, wherein the optical waveguide is an optical fiber.

36. An optical filter comprising:

an optical waveguide;

a grating formed in the optical waveguide for extracting light from a core portion of the waveguide into a cladding portion of the waveguide, the extracted light being transmitted in a guided mode along the waveguide within the cladding portion; and an active element applied to a surface of the optical waveguide and overlaying at least a portion of the grating, the active element being responsive to a light signal applied to the active element to cause a change in a characteristic of the light transmitted within the cladding layer along the optical waveguide.

37. The optical device of claim 22, wherein the second grating is a long-period grating operable to selectively return the light transmitted through the cladding layer into the core of the optical waveguide.

38. The optical device of claim 37, wherein the active element is activated to change a characteristic of the first grating, wherein light is extracted from the core of the waveguide into the cladding layer and transmitted through the cladding layer.

39. The optical device of claim 22, further comprising a second active element mounted on a side of the optical waveguide in at least partially overlapping alignment with the second grating.

40. The optical device of claim 39, wherein the second active element is activated to change a characteristic of the second grating, wherein light transmitted through the cladding layer of the optical waveguide is selectively returned to the core and thereby transmitted through the core of the waveguide.

41. The optical device of claim 22, further comprising a blocking element formed in the core of the optical waveguide at a location in the core between the first grating and the second grating.

42. An optical device, comprising:

an optical waveguide having a core covered by a cladding layer;

a first long-period grating formed in the core of the waveguide;

a second long-period grating formed in the core of the waveguide downstream of the first grating;

a blocking element formed in the core of the optical waveguide at a location in the core between the first grating and the second grating; and wherein light transmitted through the core of the waveguide is selectively extracted by first grating from the core and transmitted through the cladding layer around the blocking element.

43. The optical device of claim 42, wherein light transmitted through the cladding layer is selectively directed by the second grating into the core of the waveguide.

44. A fiber optic device, comprising:

an optical fiber having a core and a cladding layer;

a long-period grating located in the core of the optical fiber and operable to extract light from the core and transmit the light through the cladding layer; and a coating layer located on an outer surface of the cladding layer at a location along the optical fiber that is different from the location of the grating, the coating layer having a characteristic that is sensitive to an external input to change the propagation of the light through the cladding.

45. The fiber optic device of claim 44, wherein the external input is a gas.

46. The fiber optic device of claim 44, wherein the external input is a liquid.

47. The fiber optic device of claim 44, wherein the external input is radiation.

48. The fiber optic device of claim 44, wherein the characteristic of the coating layer changes when the coating layer is exposed to radiation.

49. The fiber optic device of claim 48, wherein the radiation is gamma radiation.

50. The fiber optic device of claim 48, wherein the radiation is x-ray radiation.

51. A fiber optic device, comprising:

an optical fiber having a core and a cladding layer;

a long-period grating located in the core of the optical fiber for extracting light from the core, the extracted light being transmitted in a guided mode along the fiber within the cladding layer; and an active device mounted on the outer surface of the cladding layer, the active device having a characteristic that is sensitive to an external input to change the propagation of the light within the cladding.

52. An optical filter for filtering light transmitted in an optical waveguide having a core and a cladding layer, comprising:

a first grating formed in the optical waveguide, the first grating being operable to selectively extract light from the core of the waveguide into the cladding layer, the extracted light being transmitted within the cladding layer; and a second grating formed in the optical waveguide at a location downstream of the first grating, the second grating being operable to selectively return light transmitted within the cladding layer of the waveguide into the core, the extracted light being transmitted thereafter within the core of the waveguide.

* * * * *